US012677009B1

(12) United States Patent
Gisquet

(10) Patent No.: US 12,677,009 B1
(45) Date of Patent: Jul. 7, 2026

(54) METHOD TO GENERATE HASH TABLES FOR EFFICIENT BLOCK MATCHING IN PREDICTIVE CODING

(71) Applicant: Cisco Technology, Inc., San Jose, CA (US)

(72) Inventor: Christophe Gisquet, Acigné (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 1 day.

(21) Appl. No.: 18/157,190

(22) Filed: Jan. 20, 2023

(51) Int. Cl.
| | |
|---|---|
| *H04N 7/12* | (2006.01) |
| *H04N 19/159* | (2014.01) |
| *H04N 19/172* | (2014.01) |
| *H04N 19/51* | (2014.01) |
| *H04N 19/85* | (2014.01) |

(52) U.S. Cl.
CPC ........... *H04N 19/85* (2014.11); *H04N 19/159* (2014.11); *H04N 19/172* (2014.11); *H04N 19/51* (2014.11)

(58) Field of Classification Search
CPC .... H04N 19/85; H04N 19/159; H04N 19/172; H04N 19/51
See application file for complete search history.

(56) References Cited

U.S. PATENT DOCUMENTS

| | | | | | |
|---|---|---|---|---|---|
| 9,026,615 | B1 * | 5/2015 | Sirton | ................... | H04N 19/593 |
| | | | | | 709/217 |
| 10,009,615 | B2 | 6/2018 | Gisquet et al. | | |
| 10,194,152 | B2 * | 1/2019 | Sato | ..................... | H04N 19/593 |
| 11,202,058 | B2 * | 12/2021 | Brick | ................... | H04N 13/327 |
| 11,202,085 | B1 * | 12/2021 | Holcomb | ............. | H04N 19/105 |
| 11,736,701 | B2 * | 8/2023 | Li | ......................... | H04N 19/176 |
| | | | | | 375/240.16 |
| 2006/0112264 | A1 * | 5/2006 | Agarwal | ............. | H03M 7/3084 |
| | | | | | 713/150 |
| 2014/0003496 | A1 * | 1/2014 | Kondow | ............... | H04N 19/14 |
| | | | | | 375/240.02 |
| 2015/0261884 | A1 | 9/2015 | Pang et al. | | |
| 2016/0277733 | A1 * | 9/2016 | Li | ......................... | H04N 19/96 |
| 2017/0163999 | A1 * | 6/2017 | Li | ......................... | H04N 19/105 |
| 2020/0099926 | A1 * | 3/2020 | Tanner | ................... | H04N 19/97 |

(Continued)

FOREIGN PATENT DOCUMENTS

| | | |
|---|---|---|
| CN | 111614961 A | 9/2020 |
| GB | 2531086 A | 4/2016 |

OTHER PUBLICATIONS

Wu, Y., et al, "Linear Hashtable Method and Predicted Hexagonal Search Algorithm with Moments Invariant," Vision, Video and Graphics, https://diglib.eg.org/handle/10.2312/vvg20051026, Oct. 2005, 7 pages.

(Continued)

*Primary Examiner* — Gims S Philippe
(74) *Attorney, Agent, or Firm* — Edell, Shapiro & Finnan, LLC

(57) ABSTRACT

Techniques are provided for video encoding. A method includes dividing a video frame into a plurality of areas, and generating a plurality of hash tables to be used for block matching in predictive coding of the video frame. At least one hash table of the plurality of hash tables is assigned for use for a corresponding area of the plurality of areas. The method further includes performing predictive coding of the video frame using the plurality of hash tables.

25 Claims, 11 Drawing Sheets

(56) References Cited

U.S. PATENT DOCUMENTS

| | | | | |
|---|---|---|---|---|
| 2020/0267394 A1* | 8/2020 | Tanner | .................. | H04N 19/53 |
| 2022/0286705 A1 | 9/2022 | Laroche et al. | | |
| 2023/0362390 A1* | 11/2023 | Hong | .................. | H04N 19/176 |
| 2024/0089428 A1* | 3/2024 | Li | ........................ | H04N 19/109 |

OTHER PUBLICATIONS

Zhu, W., et al, "Hash-Based Block Matching for Screen Content Coding," IEEE Transactions on Multimedia, vol. 17, No. 7, Jul. 2015, 10 pages.

Xu, J., et al, "Non-CE8: Hash-based Motion Search," Document: JVET-M0253, Joint Video Experts Team (JVET), of ITU-T SG 16 WP 3 and ISO/IEC JTC 1/SC 29/WG 11, 13th Meeting: Marrakech, MA, Jan. 9-18, 2019, 5 pages.

* cited by examiner

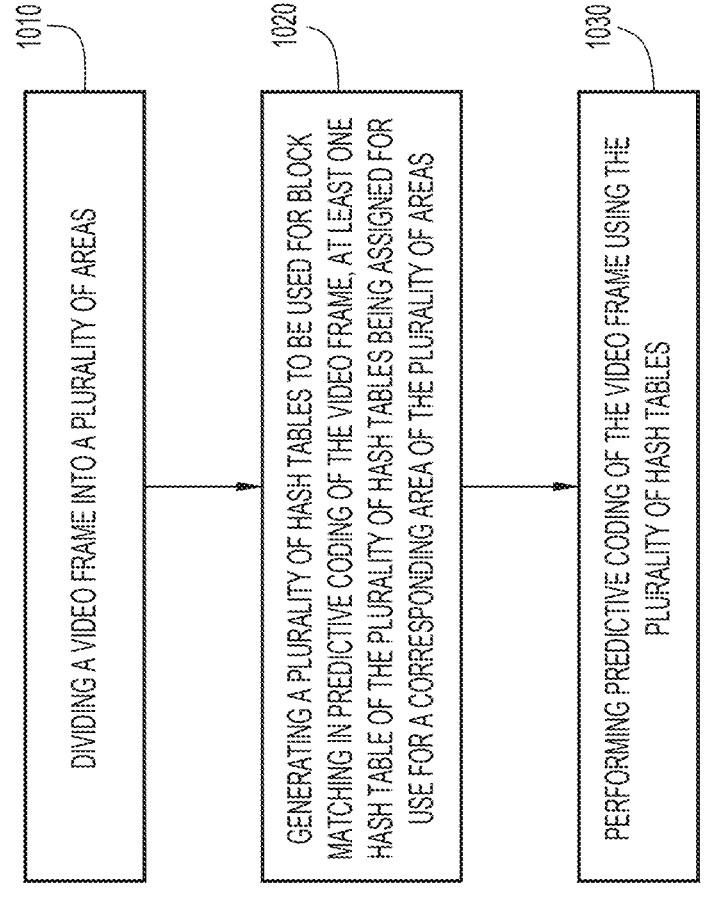

1000

1010

DIVIDING A VIDEO FRAME INTO A PLURALITY OF AREAS

1020

GENERATING A PLURALITY OF HASH TABLES TO BE USED FOR BLOCK MATCHING IN PREDICTIVE CODING OF THE VIDEO FRAME, AT LEAST ONE HASH TABLE OF THE PLURALITY OF HASH TABLES BEING ASSIGNED FOR USE FOR A CORRESPONDING AREA OF THE PLURALITY OF AREAS

1030

PERFORMING PREDICTIVE CODING OF THE VIDEO FRAME USING THE PLURALITY OF HASH TABLES

FIG.10

METHOD TO GENERATE HASH TABLES FOR EFFICIENT BLOCK MATCHING IN PREDICTIVE CODING

TECHNICAL FIELD

The present disclosure relates to video coding techniques.

BACKGROUND

Screen content, such as that occurring during a video conference or online meeting, is often repetitive and can ideally be described by a few elements. For instance, the 'e' character appears frequently in many Roman sentences. However, when performing video coding on screen capture content of desktop windows as videos or images, this characteristic of the content can be lost. One video and image coding process involves predictive coding of blocks (spatial areas of an image or video frame), whereby a block is coded in reference to a previously coded block, whether in the current image or a so-called reference image. That block is not known in advance and is usually found through a search that can be costly.

Due to the repetitiveness of screen content, one solution to finding such a block is to generate so-called hash values for candidate blocks. One example of a suitable hash value is a CRC32 computation, which is based on a cyclic redundance check (CRC) computation that is common for use in digital network and storage systems. A few hash values can summarize a block quite efficiently, e.g. with a reduced risk of collision, i.e. that another block has the same hash value. Hash values are usually stored in one or more tables indexed by hash value, so as to associate a hash value and the coordinates of its block. Therefore, finding a prediction/predicted block is mostly a matter of computing the hash of a current block and looking up the coordinates of the prediction/predicted block in the one or more tables. The number of tables and the size of the hashes have a positive impact on coding efficiency, because they allow testing more candidates (in particular if lossy coding is employed), and more accurate candidates. However the more memory needed to accommodate larger hashes, or the more tables needed, can result in search degradation, similar to the problems with a classical search (memory random access, cache misses, etc.).

BRIEF DESCRIPTION OF THE DRAWINGS

FIG. 10 is a flow chart depicting a method for encoding video according to the techniques presented herein.

DETAILED DESCRIPTION

Overview

Techniques are provided for video encoding. In one embodiment, a method includes dividing a video frame into a plurality of areas, and generating a plurality of hash tables to be used for block matching in predictive coding of the video frame. At least one hash table of the plurality of hash tables is assigned for use for a corresponding area of the plurality of areas. The method further includes performing predictive coding of the video frame using the plurality of hash tables.

EXAMPLE EMBODIMENTS

Techniques are presented herein to generate hash tables that, for a given amount of memory, provide improved coding efficiency.

Figure 1:
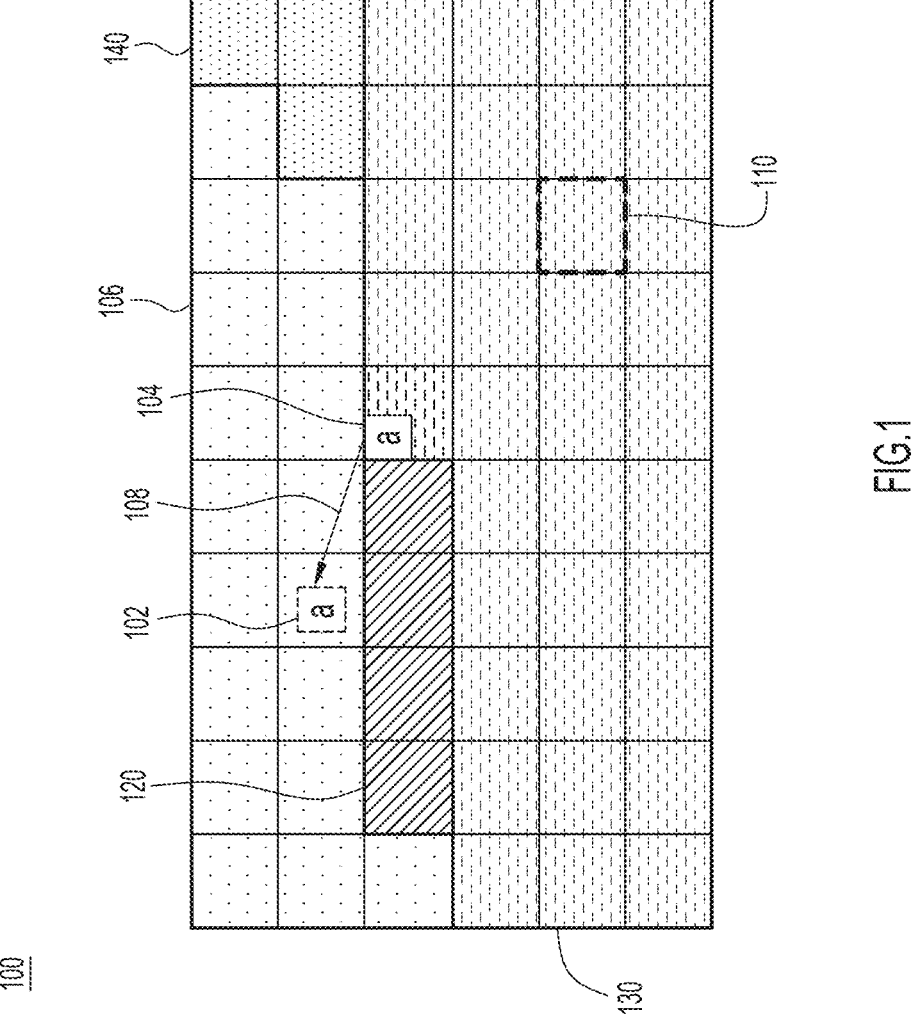
FIG. 1 is a diagram of a video frame and depicting intra block copy predictive coding techniques that are enhanced using the techniques presented herein.

Reference is first made to FIG. 1, for a description of a video coding technique called Intra Block Copy. A Block Copy operation involves finding a similar block and using it as prediction for the block being coded and transmitting the position and block-to-block differences.

FIG. 1 shows an image or frame 100. There is a predicted/prediction block 102 to be found for a block 104 being coded. The predicted/prediction block 102 is in an allowed area 106 of the frame 100.

Intra Block Copy (IBC) involves finding the predicted/prediction block 102 that minimizes a criterion for the block being coded 104 in the allowed area 106, and transmitting the displacement vector 108.

The definition of the allowed area 106 is important. Larger square blocks, such as block 110, are so-called SuperBlocks (SBs). Due to hardware design issues, a video codec standard may disallow the use of data from area 120 (256-pixel-large—previous pixels by one SB area). Other video codec standards may not have such a restriction. Area 130 is typically forbidden for intra prediction (to which IBC belongs) because it is a "non-causal" area. A non-causal area is an area that has not yet been coded so it cannot use it as previously coded data. Area 140 is another forbidden area for hardware design reasons (stair-case shape due to, for example, SB-row-pipelining). As explained above, there are many constraints defining what is and is not a valid candidate block for intra block coding.

Figure 2:
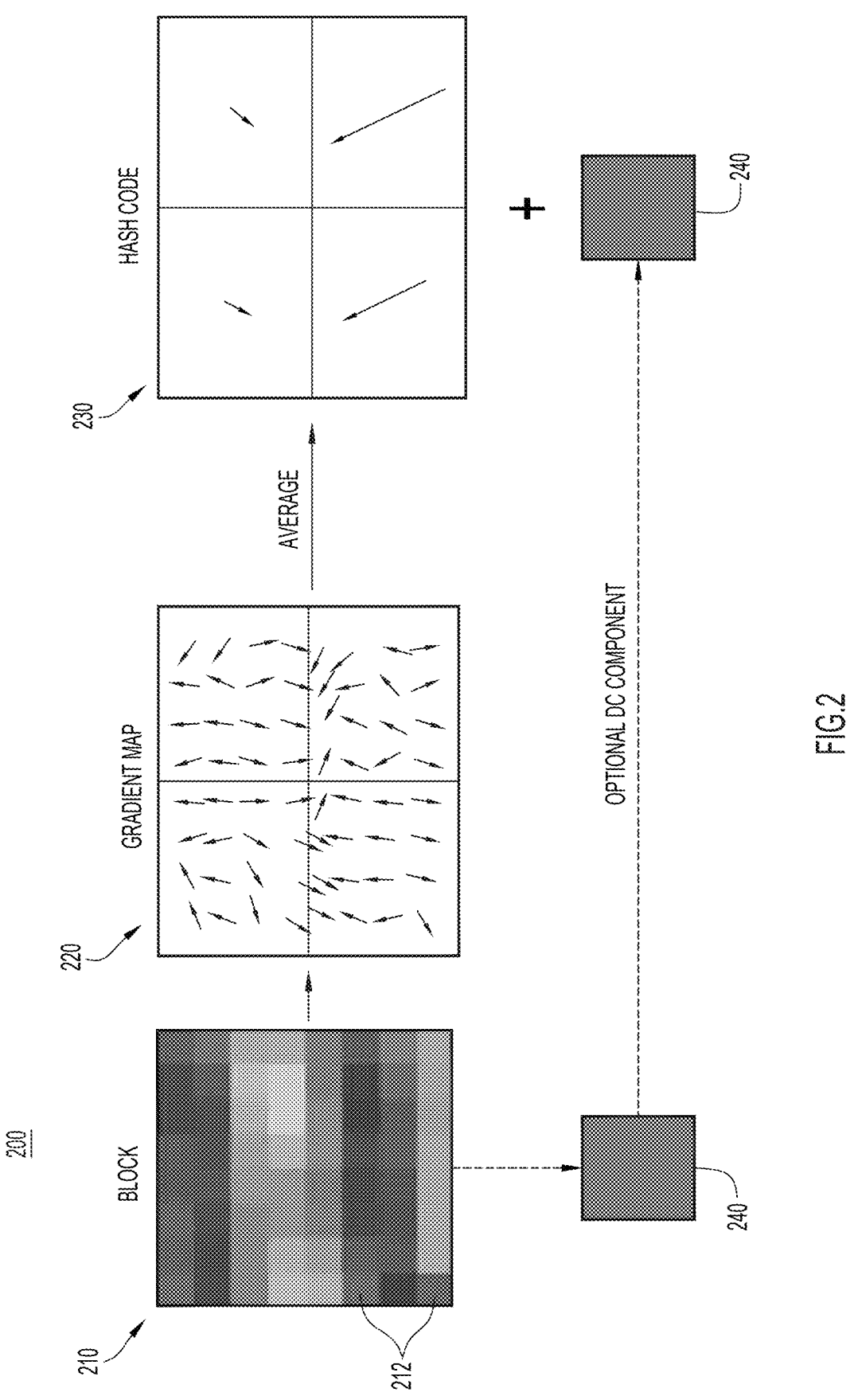
FIG. 2 is a flow diagram depicting a block copy process using hash motion estimation that may be enhanced by the techniques presented herein.

Turning now to FIG. 2, block copy process using Hash Motion Estimation (HME) is now described. The process 200 involves, for a block 210, generating a "features" code, which is used for matching for block copy instead of using the pixels 212 themselves. FIG. 2 shows a gradient map 220 for the block 210 and the hash code 230 for the block 210. The hash code 230 may be considered to represent an "average" of the gradient map 220 of the block. FIG. 2 also shows that there may be an optical DC component 240 for the block 210 that may be combined with the hash code 230.

Text is more repetitive, generally, than other image content, ignoring anti-aliasing and hinting. As a result, exact matches can be used. A hash computation is made for the block 210, and the position for the hash is retrieved. This yields the displacement vector referred to above in connection with FIG. 1.

Hashes are a way to generate short(er) integer values to denote the samples of a block, typically between 16 and 32 bits when used in block matching techniques. A small change in one or more samples will generate a different hash. Moreover, not many blocks generate the same value (which is called a "hash collision"). When coding a block, a hash of the block is computed and another block in the reference data is found that has the same hash. The hash data is written to the table, with the integer used as an index in the table.

Figure 3:
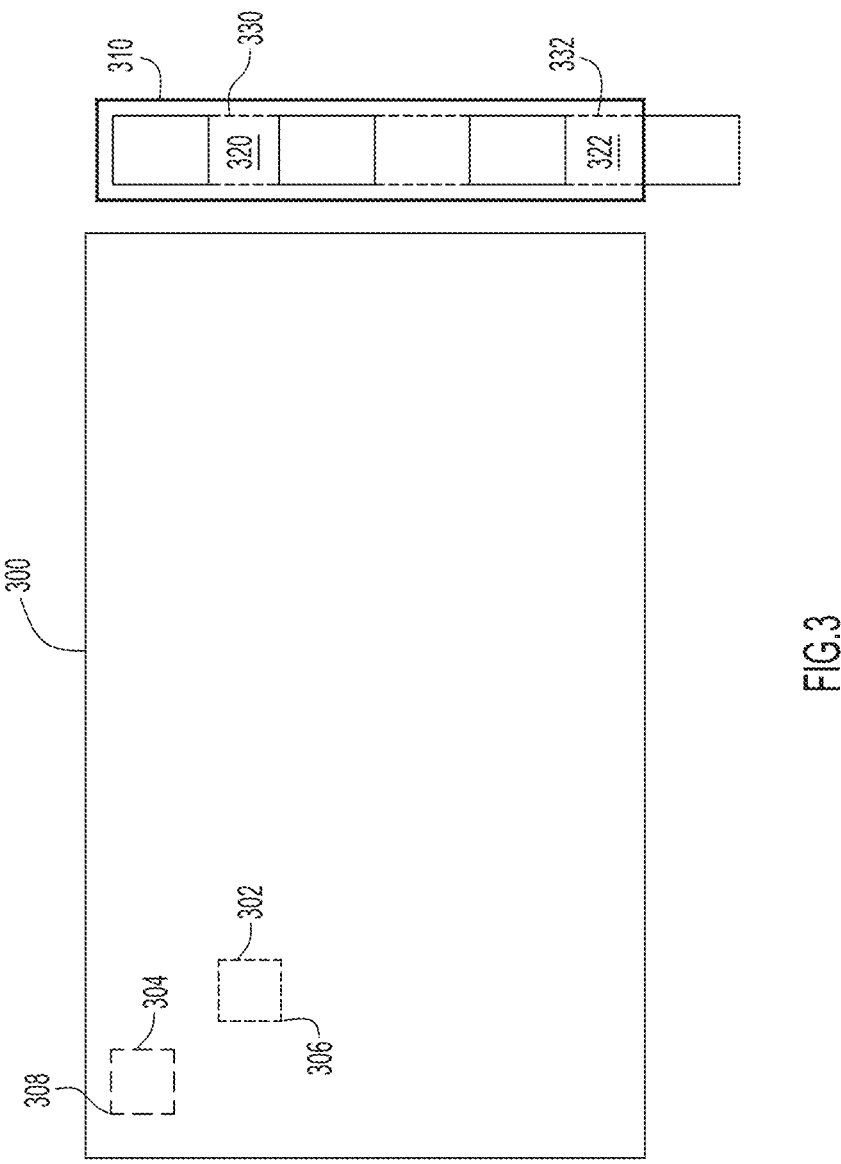
FIG. 3 is a diagram depicting blocks of a video frame for which a hash table is built to assist in hash motion estimation that is enhanced by the techniques presented herein.

Reference is now made to FIG. 3 for a description of a process for building and using a hash table. FIG. 3 shows an example of a frame 300. The hash computations yield integers that serve as indices into a table 310, and the data in the table is position information for the corresponding blocks in the frame 300.

For example, given blocks 302 and 304 whose top-left corners are respectively located at positions 306 and 308, the hash computations yield integers 320 and 322. As a consequence, "cells" 330 and 332 in table 310 are set with information respectively related to blocks 302 and 304, including positions 306 and 308 of blocks 302 and 304, respectively.

The hashes for which no position exists hold a special value (used for initialization) to denote an invalid/unusable position: the motion estimation will not use such hashes. This is advantageously performed on original images, as it is measured to be more efficient than either all or one being a reconstructed one.

Block matching is performed by, for a given hash (of a block), going to the cell in the table using that hash as an index and retrieving the last position of a similar block with that hash, and that is the block to use. It is possible to have a second, more precise hash and use that as a second level of matching. Moreover, the risk of hash collisions can be reduced by using a longer hash. Since screen content is very repetitive, the advantage of using hash motion estimation is that it is very likely to find a matching block.

Figure 4:
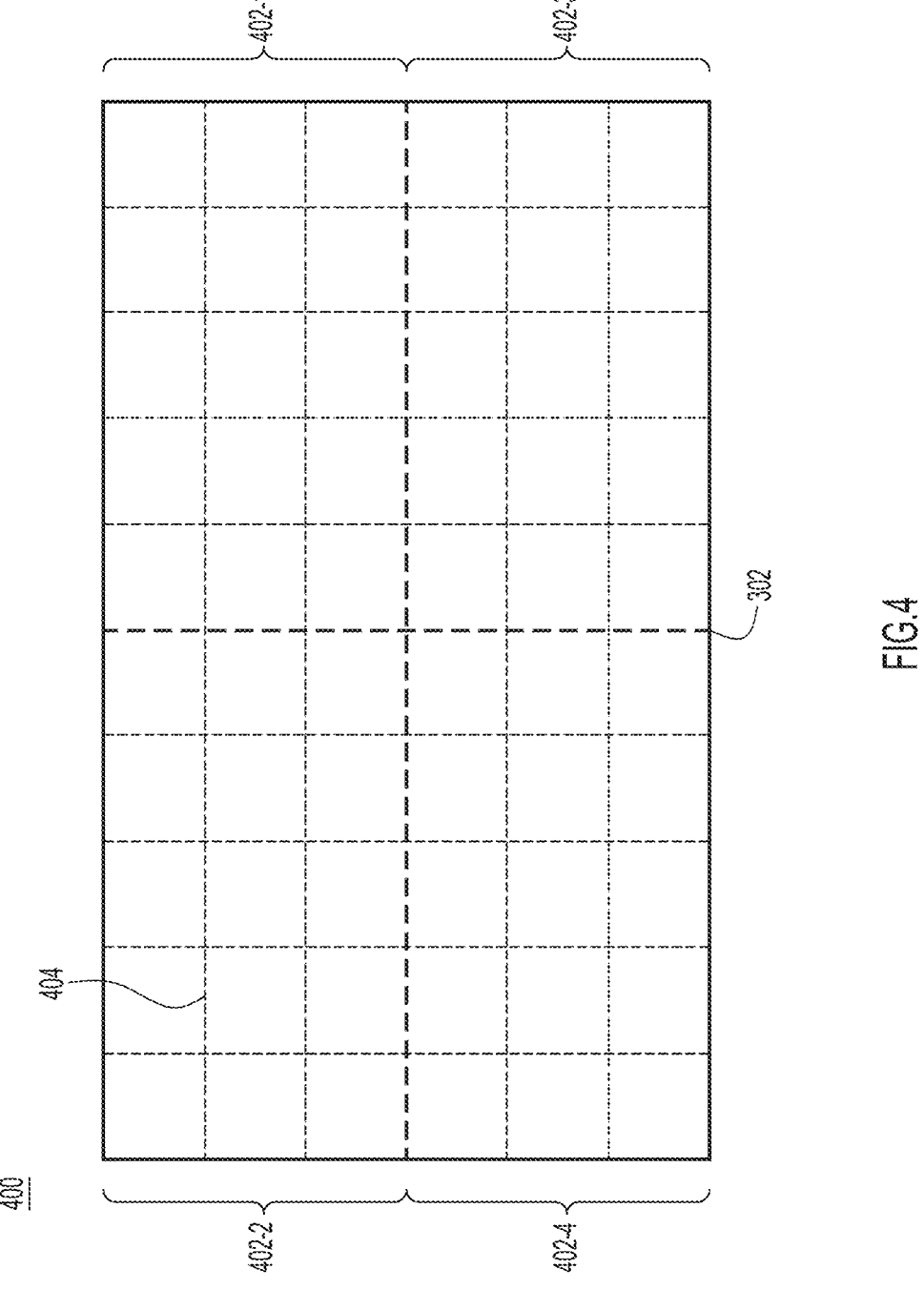
FIG. 4 is a diagram showing a video frame divided into independent areas (tiles) that are processed independently and which may be employed in the techniques presented herein.

FIG. 4 shows how tiles are used in various coding standards to split an image or frame 400 into rectangular areas processed independently. There are 4 tiles 402-1, 402-2, 402-3 and 402-4 in the example of FIG. 4. A tile is made of several coding blocks 404 (e.g., SB for the AV1 video standard and a Coding Tree Unit (CTU) for the High Efficiency Video Codec (HEVC) standard. An image is made of several tiles usually arranged in rows and columns, as shown in FIG. 4 for tiles 402-1, 402-2, 402-3 and 402-4. Data from a tile cannot be used to predict data from another tile.

The construction of the table of hashes can cause the storage of a lot of inefficient, sometimes even invalid, positions. This causes both wasted processing time (the positions do not yield usable candidates) and loss of coding efficiency (better and/or valid positions may exist). Moreover, tiles, and in general, parallel processing needs to be properly managed, otherwise even more invalid positions will be generated. A non-deterministic behavior, also known as a "threading race condition" can occur, where a thread overwrites/uses results from another thread.

Maintaining the hash tables as a first-in first-out (FIFO) buffer has a processing overhead. It does not take into account the details of the block referencing, usually a displacement vector constrained by normative (i.e., according to a video codec standard) features.

There may still be different candidate block predictors available, allowing an encoder to select the best representative (usually through the computation of a so-called Lagrangian cost known in the art). The segmenting can be designed so that thread-safety is achieved. That is, processing of a unit in parallel to at least one other unit does not impede the processing of the at least one other unit.

Presented herein are techniques to efficiently (in terms of computations and bitrate) and in thread-safe manner, generate "hash-tables" for use in coding of screen content. This is a technique useful at least for online meetings, whenever screen sharing is performed.

By spatially segmenting the unit of processing (whether an image or a slice or a tile) into columns, instead of maintaining FIFOs, several interesting properties are obtained. First, this leads to a reduced overhead compared to a FIFO. Second, it is experimentally confirmed to be more likely to have a valid and efficient displacement vector (i.e. a FIFO implementation has been shown to provide less gain). In other words, a FIFO implementation does not take into account valid/invalid areas, which is important for block matching.

The techniques presented herein involve dividing a video frame into a plurality of areas, and generating a plurality of hash tables to be used for block matching in predictive coding of the video frame. At least one hash table of the plurality of hash tables is assigned for use for a corresponding area of the plurality of areas. Predictive coding of the video frame is performed using the plurality of hash tables.

Thus, the techniques use several hash tables, one hash table per area. By segregating hash tables to an area, there is an expectation that more frequently the data in the hash table for a given area is valid. For intra block coding, the area will segregate unusable positions (where candidate blocks may otherwise be). For inter prediction, this allows finding closer matches, meaning the closer matching blocks are less costly to code. By segmenting the video frame, the candidate blocks may be a lot closer to the block of interest (that is being coded).

The techniques presented herein also may further include deciding, based on the location of the block, the size of the area for which to produce hashes to put into the hash table. Further still, the techniques presented herein may involve deciding, based on a criterion (e.g., coding cost), whether to hash an area at all. For example, it is wasteful and unnecessary to hash blocks in an area that will not be used, for instance when regular motion estimation will be used.

Table Per Area—Intra Block Copy

Figure 5:
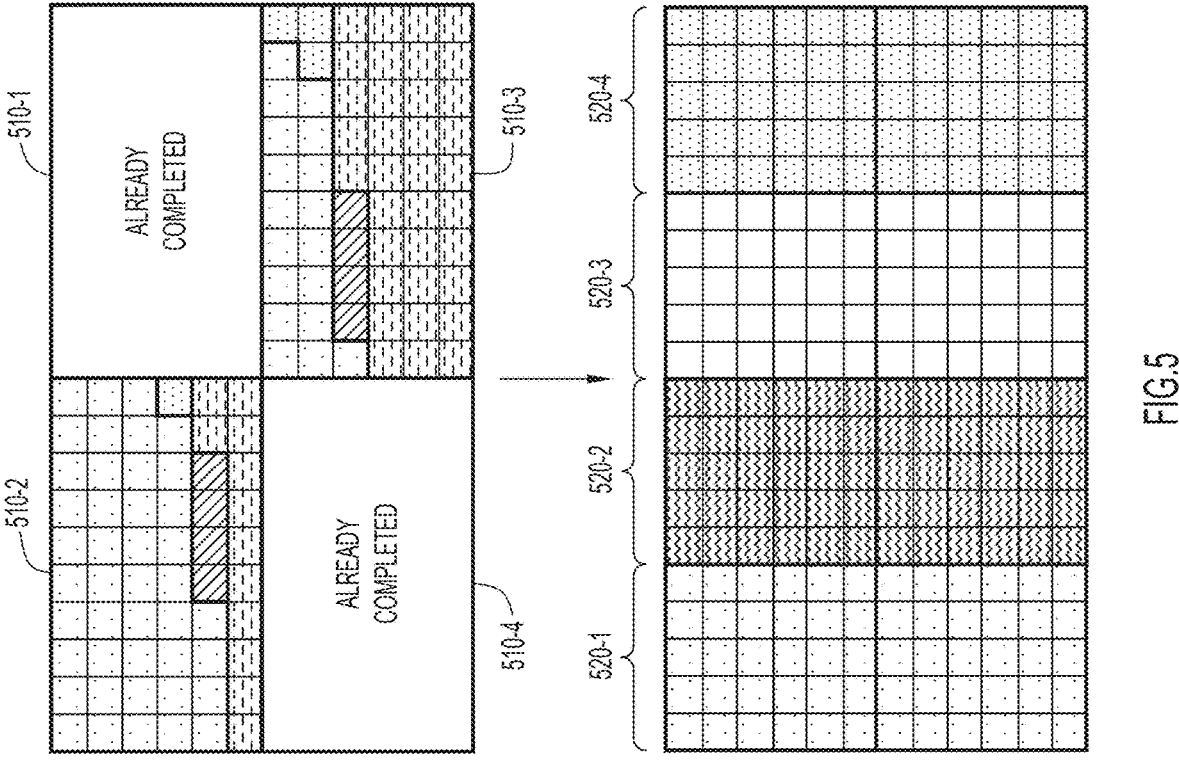
FIG. 5 is a diagram depicting techniques for generating at least one hash table (of a plurality of hash tables) for use in block matching for predictive coding of a video frame, according to an example embodiment.

Turning now to FIG. 5, the concepts of providing at least one hash table of a plurality of hash tables for use for a corresponding area of a plurality of areas for intra block coding, is now described. As described above, for intra block copy, the "forbidden" area(s) change(s) depending on the block to be coded. In addition, tiles also are to be accounted for.

Accordingly, the techniques presented herein involve splitting an image/video frame into a number of columns, aligned at SB and tiles. There is potentially an uneven count of tiles in each column. In the example of FIG. 5, there is a frame 500 having tiles 510-1, 510-2, 510-3 and 510-4, and the coding of tiles 510-1 and 510-4 has already been completed. There are four columns 520-1, 520-2, 520-3 and 520-4. A given tile will be able to use (reference) hash tables for a predetermined one or more columns. In other words, there is only a predetermined set of hash tables usable by a given tile. For example, tile 510-2 can use hash tables only of columns 520-1 and 520-2. Similarly, tile 510-4 is able to use hash tables only of columns 520-3 and 520-4. Whenever a new tile is started, the set of hash tables is reinitialized to hold only invalid positions.

To generalize, the techniques involve, for a given area, designating a predetermined set of hash tables. The given area is divided into sub-areas of what is more or less likely to be valid. This may sometimes be the rightmost column and other times the leftmost column will have the most valid positions, due to staircase shape, etc.

In some video codec standards, such as AV1, intra block copy is allowed only in intra coding mode frames, and thus it is mutually exclusive with inter coding mode. For inter coding mode, there is a set of hash tables for at least one reference image, and for intra block copy, there is yet another set of hash tables. Other video codec standards may use a different arrangement, such as HEVC or Advanced Video Coding (AVC), which do not specify the use of tiles.

Table Per Area—Inter Coding

In inter coding mode, tiles still are to be accounted for, because of the "race condition". Multiple tiles may be processed in parallel, such that different runs may generate different results (at the time of execution, different content between runs). This is the aforementioned so-called non-deterministic behavior.

Hash tables are segregated/assigned to specific areas of a frame. However, as the complete reference image data is available to the decoder, it is possible to use any hash table. The number of columns/tables can be slightly reduced in inter coding mode. Moreover, the manner in which hash tables are defined may depend on the coding mode, frame type, etc.

Further, in inter coding mode, there is no need (e.g., for normative purposes) to reinitialize hash tables at tile start. There is no concern about tiles in reference images and thus no need to forbid the use of certain areas.

Table Update—Area Size Decision

For inter coding, a look ahead of a given number of SB rows is used, and then hashes over an SB row are added at the start of an SB row. When a hash table for a particular column has already been initialized, and the process moves on to the next SB row, the hash table can be progressively filled to update the table, potentially overwriting older data.

Figures 6, 7:
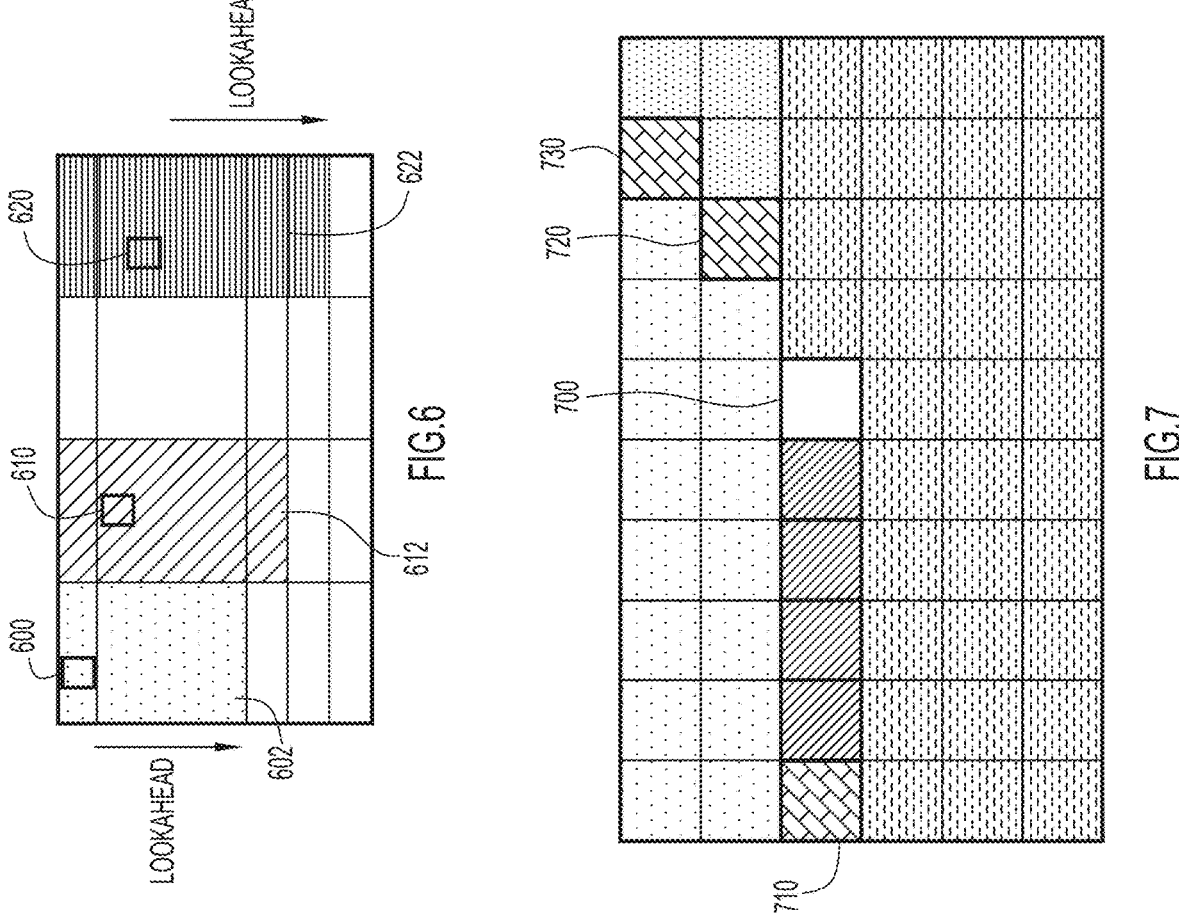
FIG. 6 is a diagram depicting techniques by which a determination is made, based on a location of a block to be coded, a size of an area of a plurality of areas for which to generate hashes, according to an example embodiment.
FIG. 7 is a diagram depicting a technique by which when the predictive coding uses intra block coding, a size of the area for which to generate hashes may correspond to a delay of a predetermined number of pixels.

As shown in FIG. 6, for blocks 600, 610 and 620, the area added to their respective hash tables is areas 602, 612 and 622, respectively, for lookahead purposes. Thus, FIG. 6 depicts a method by which a determination is made, based on a location of a block to be coded, a size of an area of the plurality of areas for which to generate hashes. When the predictive coding used is inter coding, the size of the area corresponds to a lookahead of at least one row beyond a row of the block to be coded. It is to be noted that FIG. 6 shows, as an example, that the area 602 is smaller than area 612 which in turn is smaller than area 622. The number of lookahead rows may depend on various aspects/configurations of the video encoder or the frame, such as: number of tile columns, frame width, "density" of the hash (e.g., only every $2^N$ block vertically and horizontally are hashed, to save computation cost on hashing), etc. The length of the lookahead may also depend on the tile or frame height, a desired complexity setting, etc.

As shown in FIG. 7, for intra block copy, the availability rules are to be enforced for block 700. A delay of a predetermined number of pixels, e.g., 256 pixels, may be provided before producing hashes for the added SB 710. In addition, a staircase delay is added for SBs 720 and 730. It should be noted that the area is defined by a video codec standard, as understood by a person with ordinary skill in the art. Thus, FIG. 7 depicts that when the predictive coding uses intra block coding, the size of the area may correspond to a delay of a predetermined number of pixels.

Figure 8:
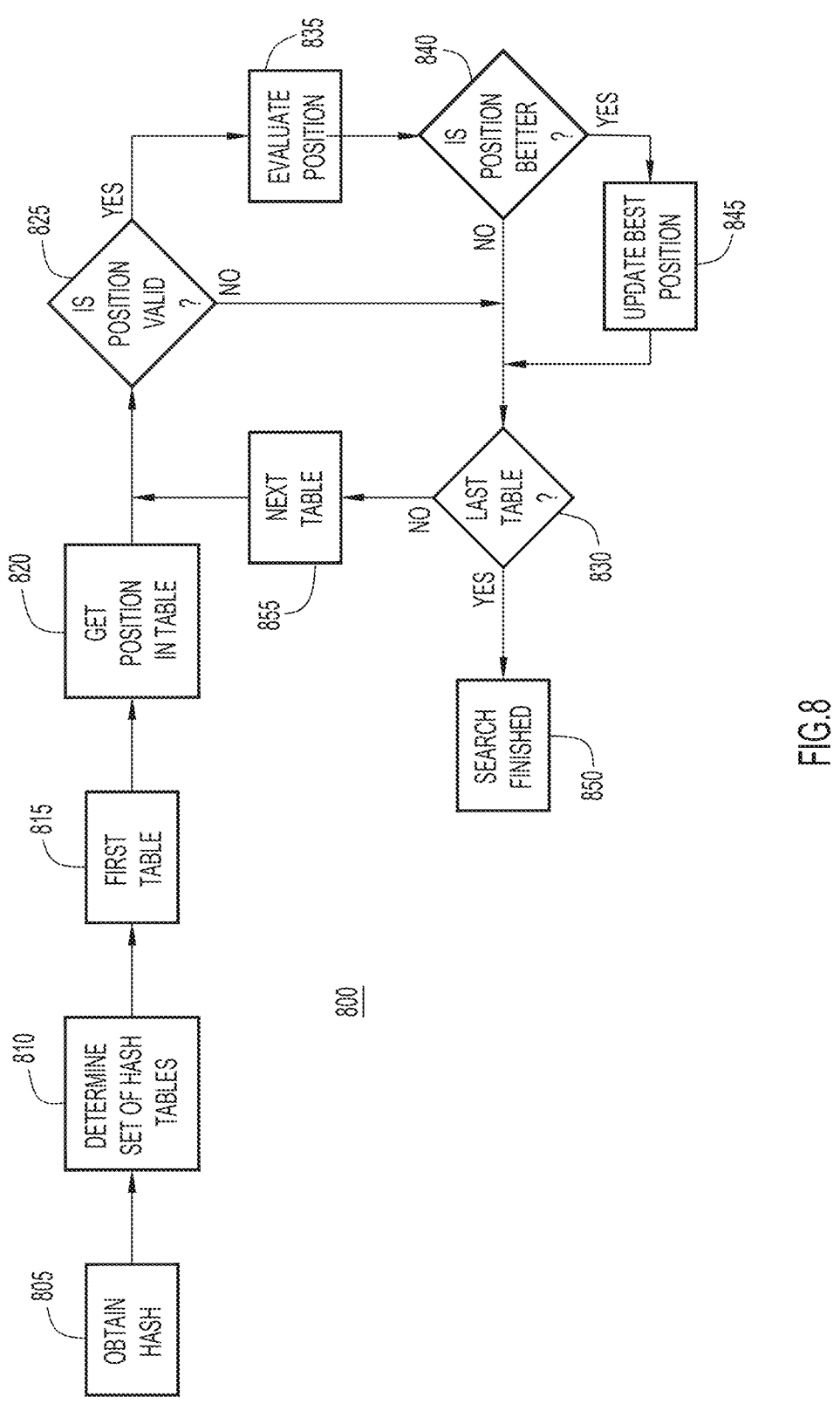
FIG. 8 is a flow chart depicting a process to use hash tables for motion estimation/intra block copy, according to an example embodiment.

Reference is now made to FIG. 8, which illustrates a flow chart depicting a process 800 to use hash tables for motion estimation/intra block copy displacement vector determination.

At step 805, the hash table search is initialized by obtaining a hash representative of the block to be encoded. This hash may be computed on all or part of the block, as long as the way of computing this hash is the same as the hash computation used to fill the hash tables. In one embodiment, the hash may be computed for a fixed (e.g. 8×8) block size. In another embodiment, the hash may correspond to an 8×8 block, the position (top-left corner coordinates) of which may be offset compared to the current block position. In yet another embodiment, several offset blocks can be used for the same block to be encoded, whether it is 8×8 or larger. For the sake of the general processing, this step also implements initializations, such as, in one embodiment, setting a current best position to a known-to-be invalid one (such as 0, or an extremum one), and a score representative of its efficiency as for a worse case.

Then, so as to use the hash to obtain positions from a hash table, a set of usable hash tables is determined at step 810. In one embodiment for intra block copy intra prediction, the hash tables (and their associated columns, as depicted in FIG. 6) are associated to the tile of the block being encoded. For inter prediction, this depends on the operating mode of the encoder. In inter prediction, in one embodiment that targets reproducible encoding results, the same constraint may be chosen. However, this can reduce coding efficiency. Therefore, for more flexibility, in one embodiment for inter coding, all hash tables are allowed to be used, regardless of threading, etc. It can be advantageous that the hash tables are created contiguously (e.g. in memory, in layout), to simplify later operations such as steps 815, 830 and 855.

Therefore, the iteration over all hash tables of the determined set starts at step 815 by selecting the first hash table in the determined set of hash tables. In one embodiment, this is the hash table for the leftmost column. In another embodiment, an ordering may be applied, such as based on the distance between current block and the column of a hash table. Then, at step 820, the position in the first hash table associated with the hash at step 805 is obtained.

At step 825, a check/determination is made as to whether the position obtained at step 820 is valid. In all cases, a known invalid position value exists, and if the value of the position found is this known position, then it is invalid. For intra coding, the position is valid based on the availability rules described above with reference to FIG. 1. For inter coding, this may involve checking whether the magnitude of the difference in one coordinate of the position and a reference position (e.g. a predictor position) is above a threshold, as specified by the video codec standard, e.g., the AV1 standard. This may also involve determining whether the position, taking into account the block offset, goes too far outside a predetermined region. For example, for reference images, the video codec standard, e.g., the AV1 standard, may provide a virtual border of one SB around the image, so that any position outside this virtual border is invalid. If the position is found to be invalid, processing goes to step 830, and if the position is valid, processing goes to step 835.

At step 835, the position is evaluated or rated. This may involve generating a score. For example, a cost is determined by computing a sum of absolute difference (SAD) or sum of squared difference (SSD) between the block pointed to by that position and the block being encoded. In the one embodiment, the cost of signaling the position in the bitstream may be taken into account, such as the Lagrangian cost J=D+λR, where D is the difference or distortion (e.g., SAD or SSD), R is rate (signaling rate) and λ is a quantizer-dependent value representing the compromise between the D and R. This is just one example of the cost and other costs may be used as is known by one of ordinary skill in the art in order to rank/order blocks and define a relative "best" for a position. In any case, this allows for comparing different positions, and ranking them. Therefore, at step 840, it is verified whether this position is the best position according to the ranking, such as whether the value of the cost J is lower than that one for current best position. If this position does not have a cost that is better than that of the current best position, processing goes step 830. Otherwise, the best position (and its score) is updated at step 845, and thereafter processing goes to step 830.

When step 830 is reached, this concludes current iteration. Thus, step 830 involves determining whether the current hash table is the last hash table of the set determined at step 810. If the current hash table is the last hash table in the set, the search concludes at step 850, possibly yielding an invalid position. Otherwise, step 855 selects the next table in the set and the next iteration of process is performed for the next table beginning at step 825.

Figure 9:
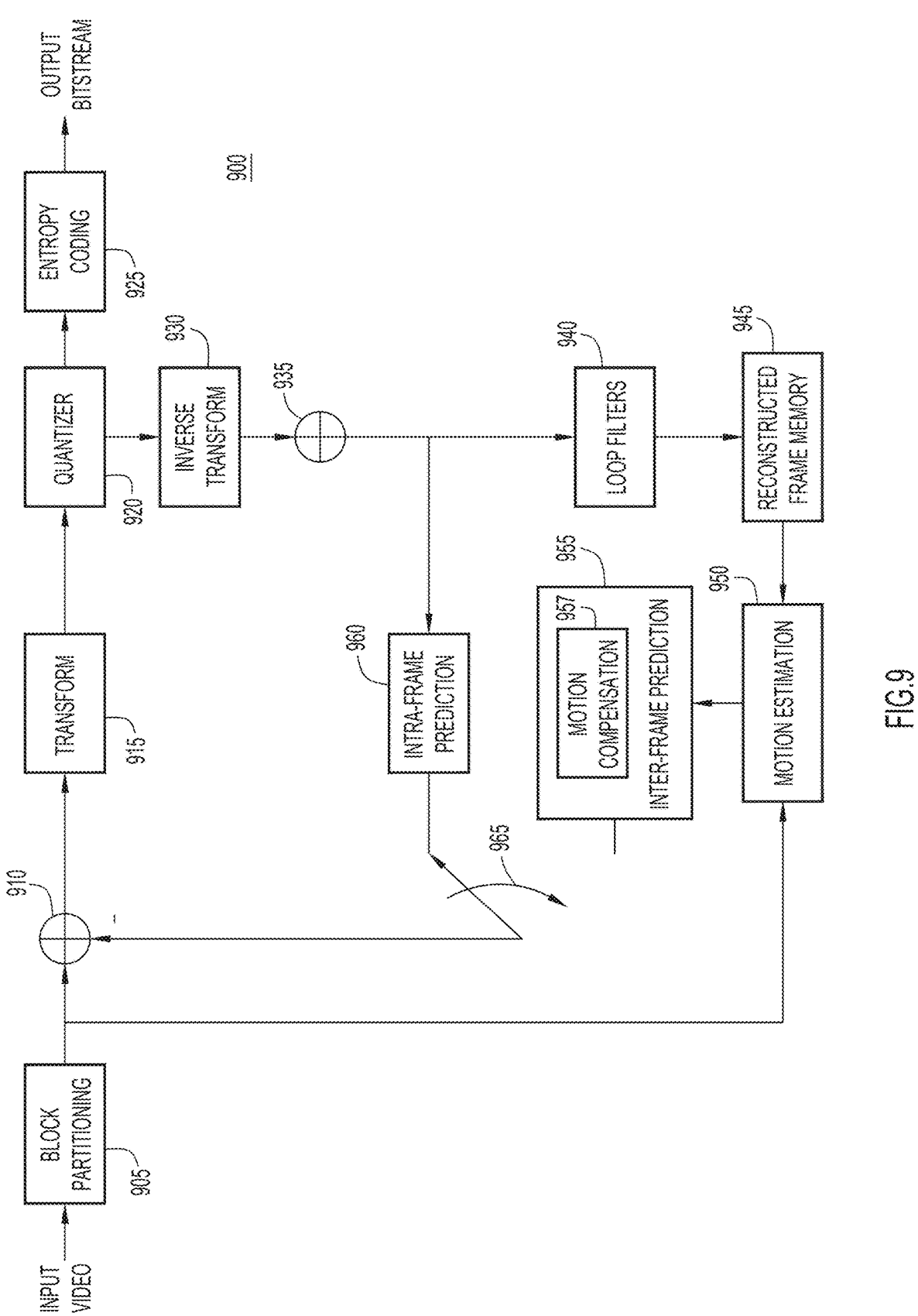
FIG. 9 is a block diagram of a video encoder configured to perform the techniques presented herein, according to an example embodiment.

FIG. 9 shows a block diagram of a video encoder 900 that is configured to encode video according to the techniques presented herein. The video encoder 900 includes various blocks, functions or modules (these terms used interchangeably in this regard), including a block partitioning module 905, a subtractor 910, a transform module 915, a quantizer module 920, an entropy coding module 925, an inverse transform module 930, an adder 935, one or more loop filters 940, a reconstructed frame memory 945, a motion estimation module 950, an inter-frame prediction module 955 that includes a motion compensation module 957, an intra-frame prediction module 960, and a switch 965. There may be other modules/functions of the video encoder 900 and FIG. 9 is not intended to exhaustive.

The block partitioning module 905 divides frames of an input video sequence into blocks of pixels (i.e. coding units such as tiles, etc.), and a coding mode (intra mode, inter mode, bidirectional, skip, etc.) may be attributed to each block.

The blocks obtained from dividing a video frame are supplied to subtractor 910. The subtractor 910 is provided with input from either the inter-frame prediction module 955 or the intra-frame prediction module 960, or a palette reconstruction module (not shown for simplicity), the selection of which is controlled by switch 965. Intra-prediction processing is selected for finding similarities within the current image frame, and is thus referred to as "intra" prediction. Motion compensation has a temporal component and thus involves analysis between successive frames that is referred to as "inter" prediction. The motion estimation module 950 supplies a motion estimation output as input to the inter-frame prediction module 955. The motion estimation module 950 receives as input the input video and an output of the reconstructed frame memory 945.

The subtractor 910 subtracts the output of the switch 965 from the pixels of the current frame, prior to being subjected to a two-dimensional transform process by the transform module 915 to produce transform coefficients. The transform coefficients are then subjected to quantization by quantizer module 920 and then supplied to entropy coding module 925. Entropy coding module 925 applies entropy encoding (e.g., arithmetic encoding) in order to remove redundancies without losing information, and is referred to as a lossless encoding process. Subsequently, the encoded data is arranged in network packets via a packetizer (not shown), prior to being transmitted in an output bit stream.

The output of the quantizer module 920 is also applied to the inverse transform module 930 and used for assisting in prediction processing. The adder 935 adds the output of the inverse transform module 930 and an output of the switch 965 (the output of the inter-frame prediction module 955 or the intra-frame prediction module 960). The output of the adder 935 is supplied to the input of the intra-frame prediction module 960 and to one or more loop filters 940 which suppress some of the sharpness in the edges to improve clarity and better support prediction processing. The output of the loop filters 940 is applied to the reconstructed frame memory 945 that holds the processed image pixel data in memory for use in subsequent motion processing by motion estimation module 950.

The hash-based prediction techniques presented herein are performed by the motion compensation module 957 for inter prediction, and by the intra-frame prediction module 960 for intra prediction. A position/motion vector is obtained that is part of the data coded by the inter-frame prediction module 955 or the intra-frame prediction module 960.

Reference is now made to FIG. 10, which shows a flow chart for a method 1000 for encoding video, according to techniques presented herein. At step 1010, the method 1000 involves dividing a video frame into a plurality of areas. At step 1020, the method 1000 involves generating a plurality of hash tables to be used for block matching in predictive coding of the video frame. Block matching is another way of saying finding a candidate block, among a plurality of candidate blocks, to use for predictive coding of a current block. In some implementations, multiple hash tables of the plurality of hash tables may be assigned for use for a corresponding area of the plurality of areas. However, there are also some implementations where a single hash table is assigned for use for a corresponding area. For example, specific areas (areas at the bottom of the frame after the lookahead) of the frame may use the same table for performance considerations.

At step 1030, the method 1000 includes performing predictive coding of the video frame using the plurality of hash tables.

As explained above, the predictive coding may use intra block copy, and each area of the plurality of areas may identify usable positions from unusable positions which change depending on a location of a block of the video frame to be coded. In other words, the location of the block to be coded determines the conditions for what positions in a frame are "unusable," essentially segregating unusable positions (subject to the block being coded).

As explained above in connection with FIG. 5, the step 1010 of dividing the video frame may involve dividing the video frame into a plurality of tiles, and further dividing the video frame into a plurality of columns that are aligned at respective tiles of the plurality of tiles. The step 1020 of generating the plurality of hash tables may be performed such that there is a predetermined set of hash tables, of the plurality of hash tables, usable by a given tile of the plurality of tiles. Moreover, when a new tile is started, the method 1000 may further include re-initializing the predetermined set of hash tables for the new tile so that the predetermined set of hash tables holds only valid positions. Further still, the plurality of columns may be further aligned at respective superblocks.

The predictive coding referred to in step 1030 may use inter coding. In this case, the step 1010 of dividing the video frame comprises dividing the video frame into a plurality of tiles, and further dividing the video frame into a plurality of columns that are aligned at respective tiles of the plurality of tiles, and any hash table of the plurality of hash tables is usable by at least one given tile of the plurality of tiles.

Table Update—On Demand

Due to the use of a table update mechanism, it is possible to decide when (to stop and start) using hash computations and for what blocks to compute hashes. Hashing is rather costly in terms of computation effort, so there can be advantages not to do hashing if there is no need/benefit for it.

Figure 11:
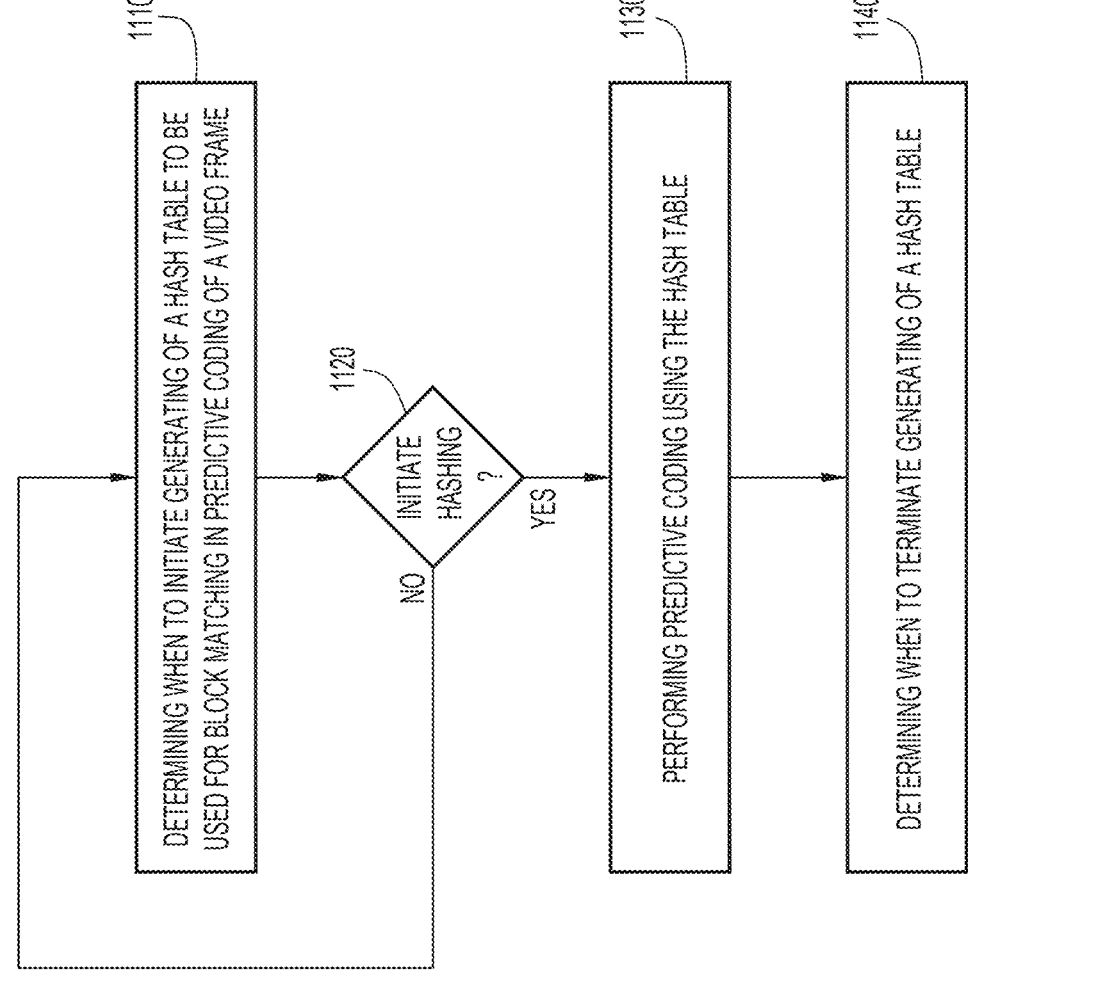
FIG. 11 is a flow chart depicting a method for determining when to start and stop generating hash tables used for block matching in predictive coding of a video frame, according to an example embodiment.

Therefore, the techniques presented herein may involve determining/deciding when to start hashing, and this may be done independently from the concept of using more than one hash table for a given area. To this end, reference is now made to FIG. 11, which illustrates a flow chart depicting a method 1100 useful for determining when to start and stop generating hash tables used for block matching in predictive coding of a video frame. The method 1100 includes, at step 1110, determining when to initiate the generating of a hash table. The hash table may be a single hash table or it may be one hash table of a plurality of hash tables for which the determination in step 1110 is being made. For example, determining when to initiate the generating of the hash table may be based on one or more of: when screen content is detected in the video frame (at the image/SB row/SB level); when hash motion estimation is to be used for the predictive coding (this may depend on motion estimation early exit situations and block cost); and after a number of blocks satisfying a criterion, of the video frame are coded (which may depend on encoder or user settings such as target encoding speed).

At step 1120, when it has been determined to initiate generating of a hash table (or multiple hash tables), then the method goes to step 1130. Otherwise, the process goes back to step 1110.

At step 1130, predictive coding is performed using the hash table (or using multiple hash tables).

Next, at step 1140, a determination is made when to terminate (stop) generating hash tables. For example, hashing can be stopped after a delay of not using hash motion estimation, such as for low cost blocks, in other words, when motion estimation is no longer used for predictive coding. The rationale for terminating hashing is that, during a scroll, regular motion estimation may find good enough matches, whereas newly appearing content is greatly helped by hash motion estimation.

Figure 12:
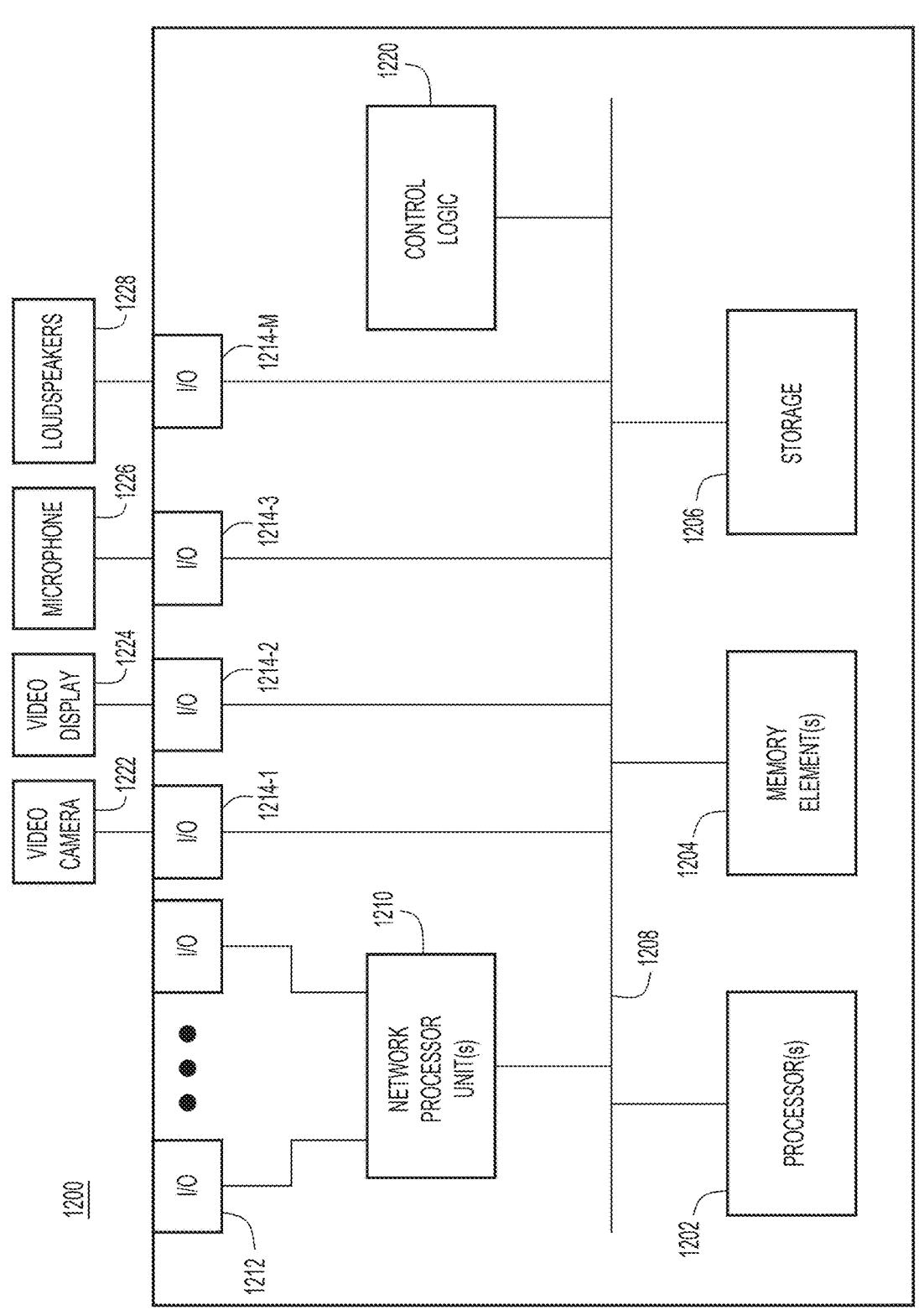
FIG. 12 is a block diagram of an apparatus that may be configured to perform the video encoding techniques presented herein.

Referring to FIG. 12, FIG. 12 illustrates a hardware block diagram of a computing device 1200 that may perform functions associated with operations discussed herein in connection with the techniques depicted in FIGS. 1-11. In various embodiments, a computing device or apparatus, such as computing device 1200 or any combination of computing devices 1200. In one example, the computing device 1200 is a device that is capable of supporting an online conference/meeting, via a conference or meeting server, with one or more other devices connected to the online conference.

In at least one embodiment, the computing device 1200 may be any apparatus that may include one or more processor(s) 1202, one or more memory element(s) 1204, storage 1206, a bus 1208, one or more network processor unit(s) (also called a communication interface) 1210 interconnected with one or more network input/output (I/O) interface(s) 1212, one or more I/O interface(s) 1214-1, 1214-2, 1214-3, . . . , 1214-M, and control logic 1220. In various embodiments, instructions associated with logic for computing device 1200 can overlap in any manner and are not limited to the specific allocation of instructions and/or operations described herein.

In at least one embodiment, processor(s) 1202 is/are at least one hardware processor (microprocessor or microcontroller) configured to execute various tasks, operations and/or functions for computing device 1200 as described herein according to software and/or instructions configured for computing device 1200. Processor(s) 1202 (e.g., a hardware processor) can execute any type of instructions associated with data to achieve the operations detailed herein. In one example, processor(s) 1202 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1204 and/or storage 1206 is/are configured to store data, information, software, and/or instructions associated with computing device 1200, and/or logic configured for memory element(s) 1204 and/or storage 1206. For example, any logic described herein (e.g., control logic 1220) can, in various embodiments, be stored for computing device 1200 using any combination of memory element(s) 1204 and/or storage 1206. Note that in some embodiments, storage 1206 can be consolidated with memory element(s) 1204 (or vice versa), or can overlap/exist in any other suitable manner.

In at least one embodiment, bus 1208 can be configured as an interface that enables one or more elements of computing device 1200 to communicate in order to exchange information and/or data. Bus 1208 can be implemented with any architecture designed for passing control, data and/or information between processors, memory elements/storage, peripheral devices, and/or any other hardware and/or software components that may be configured for computing device 1200. In at least one embodiment, bus 1208 may be implemented as a fast kernel-hosted interconnect, potentially using shared memory between processes (e.g., logic), which can enable efficient communication paths between the processes.

In various embodiments, network processor unit(s) 1210 may enable communication between computing device 1200 and other systems, entities, etc., via network I/O interface(s) 1212 (wired and/or wireless) to facilitate operations discussed for various embodiments described herein. In various embodiments, network processor unit(s) 1210 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 1200 and other systems, entities, etc. to facilitate operations for various embodiments described herein. In various embodiments, network I/O interface(s) 1212 can be configured as one or more Ethernet port(s), Fibre Channel ports, any other I/O port(s), and/or antenna(s)/antenna array(s) now known or hereafter developed. Thus, the network processor unit(s) 1210 and/or network I/O interface(s) 1212 may include suitable interfaces for receiving, transmitting, and/or otherwise communicating data and/or information in a network environment.

I/O interface(s) 1214-1 to 1214-M allow for input and output of data and/or information with other entities that may be connected to computing device 1200. For example, to support involvement of the computing device 1200 in an online meeting, the I/O interface(s) 1214-1 to 1214-M may provide a connection to external devices such as a video camera 1222, video display (e.g., touch-screen display) 1224, microphone 1226 and loudspeaker 1228, and/or any other suitable input and/or output device now known or hereafter developed. It is also envisioned that many of these external devices may be integrated as part of the computing device 1200. In some instances, external devices can also include portable computer readable (non-transitory) storage media such as database systems, thumb drives, portable optical or magnetic disks, and memory cards.

In various embodiments, control logic 1220 can include instructions that, when executed, cause processor(s) 1202 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1220) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1204 and/or storage 1206 can store data, software, code, instructions (e.g., processor instructions), logic, parameters, combinations thereof, and/or the like used for operations described herein. This includes memory element(s) 1204 and/or storage 1206 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In some aspects, the techniques described herein relate to a method including: dividing a video frame into a plurality of areas; generating a plurality of hash tables to be used for block matching in predictive coding of the video frame, at least one hash table of the plurality of hash tables being assigned for use for a corresponding area of the plurality of areas; and performing predictive coding of the video frame using the plurality of hash tables.

In some aspects, the predictive coding uses intra block copy, and each area of the plurality of areas identify usable positions from unusable positions which change depending on a location of a block of the video frame to be coded.

In some aspects, the dividing includes dividing the video frame into a plurality of tiles, and further dividing the video frame into a plurality of columns that are aligned at respective tiles of the plurality of tiles, and wherein generating the plurality of hash tables is performed such that there is a predetermined set of hash tables, of the plurality of hash tables, usable by a given tile of the plurality of tiles.

In some aspects, when a new tile is started, further including re-initializing the predetermined set of hash tables for the new tile so that the predetermined set of hash tables holds only valid positions.

In some aspects, the plurality of columns are further aligned at respective superblocks.

In some aspects, the predictive coding uses inter coding, and wherein dividing includes dividing the video frame into a plurality of tiles, and further dividing the video frame into a plurality of columns that are aligned at respective tiles of the plurality of tiles, and wherein any hash table of the plurality of hash tables is usable by at least one given tile of the plurality of tiles.

In some aspects, the method further includes: determining, based on a location of a block to be coded, a size of an area of the plurality of areas for which to generate hashes.

In some aspects, the predictive coding uses inter coding, and the size of the area corresponds to a lookahead of at least one row beyond a row of the block to be coded.

In some aspects, the predictive coding uses intra block coding, and the size of the area corresponds to a delay of a predetermined number of pixels.

In some aspects, the method further includes: determining when to initiate the generating of a hash table of the plurality of hash tables.

In some aspects, determining when to initiate the generating of the hash table is based on one or more of: when screen content is detected in the video frame; when hash motion estimation is to be used for the predictive coding; and after a number of blocks satisfying a criterion, of the video frame are coded.

In some aspects, the method further includes: determining when to terminate the generating of the hash table of the plurality of hash tables.

In some aspects, determining when to terminate the generating of the hash table a delay after hash motion estimation is no longer used for the predictive coding.

In some aspects, the techniques described herein relate to an apparatus including: a communication interface that enables network communications; a memory; and one or more processors coupled to the communication interface and the memory, wherein the one or more processors are configured to perform operations including: dividing a video frame into a plurality of areas; generating a plurality of hash tables to be used for block matching in predictive coding of the video frame, at least one hash table of the plurality of hash tables being assigned for use for a corresponding area of the plurality of areas; and performing predictive coding of the video frame using the plurality of hash tables.

In some aspects, the techniques described herein relate to an apparatus, wherein the predictive coding uses intra block copy, and each area of the plurality of areas identify usable positions from unusable positions which change depending on a location of a block of the video frame to be coded.

In some aspects, the techniques described herein relate to an apparatus, wherein dividing includes dividing the video frame into a plurality of tiles, and further dividing the video frame into a plurality of columns that are aligned at respective tiles of the plurality of tiles, and wherein generating the plurality of hash tables is performed such that there is a predetermined set of hash tables, of the plurality of hash tables, usable by a given tile of the plurality of tiles.

In some aspects, the techniques described herein relate to an apparatus, wherein the predictive coding uses inter coding, and wherein dividing includes dividing the video frame into a plurality of tiles, and further dividing the video frame into a plurality of columns that are aligned at respective tiles of the plurality of tiles, and wherein any hash table of the plurality of hash tables is usable by at least one given tile of the plurality of tiles.

In some aspects, the techniques described herein relate to an apparatus, wherein the one or more processors are configured to perform operations including: determining, based on a location of a block to be coded, a size of an area of the plurality of areas for which to generate hashes.

In some aspects, the techniques described herein relate to an apparatus, wherein the one or more processors are configured to perform operations including: determining when to initiate the generating of a hash table of the plurality of hash tables.

In some aspects, the techniques described herein relate to one or more non-transitory computer readable storage media encoded with instructions that, when executed by a processor, cause the processor to: dividing a video frame into a plurality of areas; generating a plurality of hash tables to be used for block matching in predictive coding of the video frame, at least one hash table of the plurality of hash tables being assigned for use for a corresponding area of the plurality of areas; and performing predictive coding of the video frame using the plurality of hash tables.

In some aspects, the techniques described herein relate to one or more non-transitory computer readable storage media, wherein the predictive coding uses intra block copy, and each area of the plurality of areas identify usable positions from unusable positions which change depending on a location of a block of the video frame to be coded.

In some aspects, the techniques described herein relate to one or more non-transitory computer readable storage media, wherein dividing includes dividing the video frame into a plurality of tiles, and further dividing the video frame into a plurality of columns that are aligned at respective tiles of the plurality of tiles, and wherein generating the plurality of hash tables is performed such that there is a predetermined set of hash tables, of the plurality of hash tables, usable by a given tile of the plurality of tiles.

In some aspects, a method is provided to determine when to start and stop generating hash tables used for block matching in predictive coding of a video frame. The method may include determining when to initiate the generating of a hash table. The hash table may be a single hash table or it may be one hash table of a plurality of hash tables. When it is determined to initiate generating of a hash table (or multiple hash tables), predictive coding is performed using the hash table (or using multiple hash tables, as described above in connection with FIGS. 5-10). The method may further include determining when to terminate (stop) generating hash tables. For example, hashing can be stopped after a delay of not using hash motion estimation, such as for low cost blocks, in other words, when motion estimation is no longer used for predictive coding.

VARIATIONS AND IMPLEMENTATIONS

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
dividing a video frame into a plurality of tiles and into a plurality of columns, wherein each of the plurality of columns spans across one or more tiles of the plurality of tiles;
determining when to initiate generating of a hash table of a plurality of hash tables;
generating the plurality of hash tables to be used for block matching in predictive coding of the video frame, at least two hash tables of the plurality of hash tables are usable by at least one of the plurality of tiles, and wherein the at least two hash tables are generated for a predetermined set of columns among the plurality of columns;
performing predictive coding of the video frame using the plurality of hash tables; and
determining when to terminate the generating of the hash table based on a delay after hash motion estimation is no longer used for the predictive coding.

2. The method of claim 1, wherein the predictive coding uses intra block copy.

3. The method of claim 2, wherein the plurality of columns are aligned at respective tiles of the plurality of tiles.

4. The method of claim 3, when a new tile is started, further comprising re-initializing the at least two hash tables for the new tile so that the at least two hash tables hold only valid positions.

5. The method of claim 3, wherein the plurality of columns are further aligned at respective superblocks.

6. The method of claim 1, wherein the predictive coding uses inter coding.

7. The method of claim 1, further comprising:
determining, based on a location of a block to be coded, a size of a tile of the plurality of tiles for which to generate hashes.

8. The method of claim 7, wherein the predictive coding uses inter coding, and the size of the tile corresponds to a lookahead of at least one row beyond a row of the block to be coded.

9. The method of claim 7, wherein the predictive coding uses intra block coding, and the size of the tile corresponds to a delay of a predetermined number of pixels.

10. The method of claim 1, wherein determining when to initiate the generating of the hash table is based on one or more of: when screen content is detected in the video frame; when the hash motion estimation is to be used for the predictive coding; and after a number of blocks satisfying a criterion, of the video frame are coded.

11. The method of claim 1, wherein a cost of signaling a position of at least one hash table of the plurality of hash tables in a bitstream is determined based on a sum of absolute differences or a sum of squared differences between a block in the video frame pointed to by the position of the at least one hash table and a block in the video frame to be encoded, a signaling rate, and a quantizer-dependent value, and wherein the position in the at least one hash table is ranked among a plurality of positions in the at least one hash table based on the cost of signaling the position in the bitstream.

12. The method of claim 1, wherein at least one hash table of the plurality of hash tables is usable by at least two tiles of the plurality of tiles.

13. The method of claim 1, wherein a total number of the plurality of hash tables is different from a total number of the plurality of tiles or a total number of the plurality of columns.

14. An apparatus comprising:
a communication interface that enables network communications;
a memory; and
one or more processors coupled to the communication interface and the memory, wherein the one or more processors are configured to perform operations including:
dividing a video frame into a plurality of tiles and into a plurality of columns, wherein each of the plurality of columns spans across one or more tiles of the plurality of tiles;
generating a plurality of hash tables to be used for block matching in predictive coding of the video frame, at least two hash tables of the plurality of hash tables are usable by at least one of the plurality of tiles, wherein the at least two hash tables are generated for a predetermined set of columns among the plurality of columns, wherein a cost of signaling a position of at least one hash table of the plurality of hash tables in a bitstream is determined based on a sum of absolute differences or a sum of squared differences between a block in the video frame pointed to by the position of the at least one hash table and a block in the video frame to be encoded, a signaling rate, and a quantizer-dependent value, and wherein the position in the at least one hash table is ranked among a plurality of positions in the at least one hash table based on the cost of signaling the position in the bitstream; and
performing predictive coding of the video frame using the plurality of hash tables.

15. The apparatus of claim 14, wherein the predictive coding uses intra block copy.

16. The apparatus of claim 15, wherein the plurality of columns are aligned at respective tiles of the plurality of tiles.

17. The apparatus of claim 14, wherein the predictive coding uses inter coding.

18. The apparatus of claim 14, wherein the one or more processors are configured to perform operations including:
determining, based on a location of a block to be coded, a size of a tile of the plurality of tiles for which to generate hashes.

19. The apparatus of claim 14, wherein the one or more processors are configured to perform operations including:
determining when to initiate generating of a hash table of the plurality of hash tables.

20. The apparatus of claim 14, wherein the at least one hash table of the plurality of hash tables is usable by at least two tiles of the plurality of tiles.

21. One or more non-transitory computer readable storage media encoded with instructions that, when executed by a processor, cause the processor to:
divide a video frame into a plurality of tiles and into a plurality of columns, wherein each of the plurality of columns spans across one or more tiles of the plurality of tiles;

determine, based on a location of a block to be coded, a size of a tile of the plurality of tiles for which to generate hashes;

generate a plurality of hash tables to be used for block matching in predictive coding of the video frame, at least two hash tables of the plurality of hash tables are usable by at least one of the plurality of tiles, and wherein the at least two hash tables are generated for a predetermined set of columns among the plurality of columns; and perform predictive coding of the video frame using the plurality of hash tables, wherein the predictive coding uses intra block coding, and the size of the tile corresponds to a delay of a predetermined number of pixels.

22. The one or more non-transitory computer readable storage media of claim 21, wherein the plurality of columns are aligned at respective tiles of the plurality of tiles.

23. The one or more non-transitory computer readable storage media of claim 21, wherein at least one hash table of the plurality of hash tables is usable by at least two tiles of the plurality of tiles.

24. The one or more non-transitory computer readable storage media of claim 21, wherein a cost of signaling a position of at least one hash table of the plurality of hash tables in a bitstream is determined based on a sum of absolute differences or a sum of squared differences between a block in the video frame pointed to by the position of the at least one hash table and a block in the video frame to be encoded, a signaling rate, and a quantizer-dependent value.

25. The one or more non-transitory computer readable storage media of claim 24, wherein the position in the at least one hash table is ranked among a plurality of positions in the at least one hash table based on the cost of signaling the position in the bitstream.

* * * * *